J. MERCIER
AIRPLANE LANDING GEAR
Filed June 27, 1940
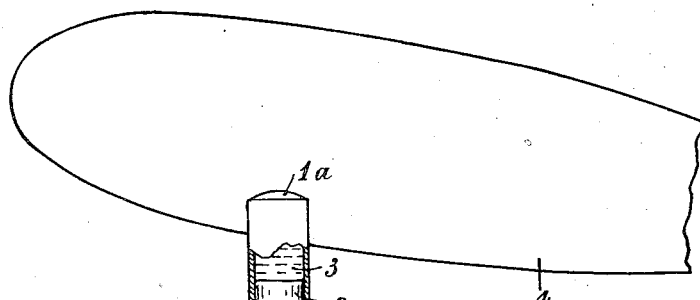
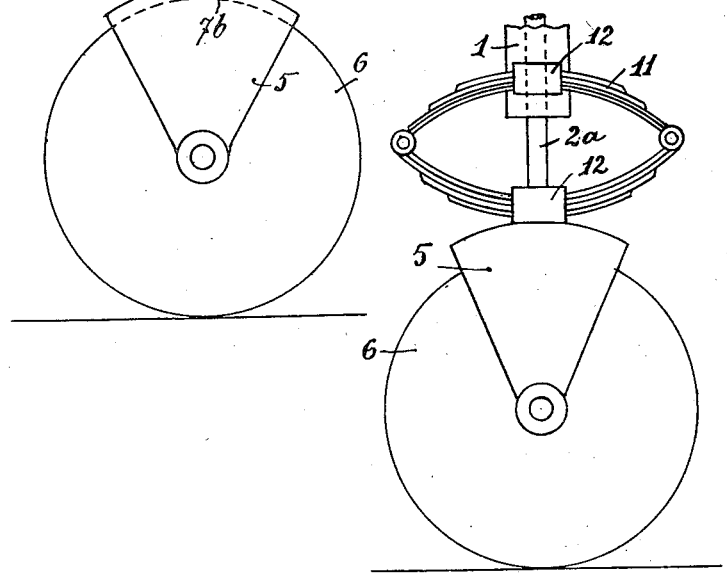
Jean Mercier
INVENTOR
his ATTY.

Patented Jan. 16, 1945

2,367,467

UNITED STATES PATENT OFFICE 2,367,467

AIRPLANE LANDING GEAR

Jean Mercier, Neuilly-sur-Seine, France; vested in the Alien Property Custodian

Application June 27, 1940, Serial No. 342,756
In France September 27, 1937

3 Claims. (Cl. 244—104)

The present invention relates to landing gear used on aircraft.

Landing gears are known in which each wheel is mounted on a single strut which is formed by a closed cylinder and a piston. The cylinder, and also in some cases the piston, contains oil or another appropriate liquid, and means are provided for choking its circulation, so that the relative movement of the cylinder and piston is suitably damped. A landing gear of this type is described in my U. S. Patent 2,212,922, issued August 27, 1940.

Usually, the resilient force required to support the weight of the airplane is supplied by the cushion of compressed air provided above the liquid. In devices of this type, in which the work chamber formed in the cylinder is of variable volume, as is the case in the landing gear described in my aforesaid copending application, it is obviously necessary for a certain volume of compressible fluid to be provided in said chamber, contrary to what takes place in shock-absorbers which cause the liquid to circulate in a chamber of constant total volume, usually, said compressible fluid, such as air, is given such a pressure that it is capable of supporting the weight of the airplane and thus forms the resilient suspension means for the wheel. However, owing to the high pressure in the work chamber, the liquid and sometimes the air, gradually escapes by leaking between the contacting surfaces of the cylinder and piston.

In order to prevent the wheel from swinging or from being unduly turned owing to the relative pivoting of the piston and cylinder, which are usually of round cross-section, various means are provided, such as conventional guiding means, on the cylinder and the piston, which enable them to slide but prevent them from rotating relatively to each other.

The object of the present invention is to provide simple means for preventing the wheel from swinging, to provide a resilient suspension force, thereby to reduce the pressure of the compressed fluid in the work chamber and eliminate the sliding friction of the conventional guiding means.

Another object of the invention is to provide a fluid-tight closure for the cylinder behind the piston.

The invention will now be described with reference to the accompanying drawing in which:

Fig. 1 is a side view of a landing gear according to the invention, with certain parts shown diagrammatically and certain parts having portions broken away so as to show the construction better.

Fig. 2 is a partial side view of another landing gear incorporating the invention.

Referring to Fig. 1, the landing gear shown comprises a strut formed by a cylinder 1 and a piston 2 with its rod $2^a$. A work chamber 3 is formed between the end $1^a$ of the cylinder and the piston 2. Said chamber contains the liquid which the reciprocation of the piston forces through suitable passages, not shown, so that the cylinder and piston unit essentially forms a shock-absorber. The cylinder 1 is fixed to the body of the airplane 4 (the expression "body" should be understood as also including the wings or any other part rigidly fixed to the body proper), and the piston 2 to the mounting, such as the fork 5 of the wheel 6. It is however obvious that the reverse arrangement could be employed.

According to the invention, the cylinder is connected to the piston by a member which is resiliently deformable in the direction of reciprocation of the piston in the cylinder, but substantially rigid with respect to torsional stresses. Said member is formed, in the device shown in Fig. 1, by an inflated boot 7, made of rubber and reinforced by a fabric as shown at $7^a$. Said boot has two necks $7^b$, one of which is fixed by vulcanization to the open end of the cylinder 1, and the other to the piston, viz., to a circle 8 fixed to the wheel mounting 5 at the foot of the piston rod $2^a$. The joints of the boot 7 are reinforced by means of collars 9, to which the necks $7^b$ are also preferably fixed by vulcanization.

Owing to the fluid-tight fixing of the boot 7, a closed chamber 10 is formed in said boot and the cylinder 1 behind the piston 2. Since the boot is of much larger cross-section than the annular cross-section of the cylinder behind the piston the volume of the chamber 10 decreases when the piston moves into the cylinder, and the air or other gas, if any, which is contained therein is compressed. By filling the chamber 10 at a suitable pressure, it is possible to arrange for the weight of the airplane to be supported by the pressure of the compressed air in the same whereby the function of the piston-cylinder unit may be essentially reduced to that of a shock absorber.

It will be seen that the wheel is prevented from swinging by the rigidity of the boot 7 with respect to torsional stresses, whereas any other guiding means which produce sliding friction or require more complicated devices are eliminated. It is however possible to provide devices which more or less relieve the boot 7 or other like connecting means according to the invention, such for example as the additional strut 22, 24 shown in my aforesaid copending application.

Another device which resists torsional stresses and can also be made to bear the weight of the airplane resting upon the wheel to which said device is applied, is shown in Fig. 2. The connecting means is in this case formed by a leaf spring 11 of the elliptic leaf type which is well known in horse-drawn vehicles. One of the buckles 12 of this spring is fixed to the cylinder 1, and the other to the piston, viz., in the case illustrated, to its rod 2a or to the fork 5. In its preferred form the spring is mounted in the center of the fork mounting in the radial plane of the wheel.

It will also be understood that the invention should not be limited to the arrangement in which the cylinder is fixed to the airplane, and the piston to the wheel, and that other modifications may be made within the scope of the appended claims.

Having now described my invention, what I claim as new and desire to secure by Letters Patent is:

1. A landing gear for aircraft and the like, comprising a wheel mounted in a fork mounting, a non-elastic shock-absorber of the cylinder and piston type, said shock-absorber forming a yielding strut rigidly secured at its ends to the aircraft body and the wheel mounting, respectively, for supporting the wheel mounting from the aircraft body, the piston being rotatably mounted in the cylinder, and an axially compressible boot of flexible material tightly and rigidly secured to said cylinder and piston and inflated so as to resiliently support the weight of said aircraft resting upon said wheel.

2. Landing gear according to claim 1, wherein the boot is made of rubber reinforced by a fabric.

3. Landing gear according to claim 1, wherein the boot is made at least partially of rubber and is secured to the cylinder and the piston by vulcanization thereon.

JEAN MERCIER.